N° 45,962. CHARLES ABEL'S HOISTING MACHINE.

Patented Jany. 24. 1865.

O. T. Hatfield
James E. Ware
} Witnesses.

C. Abel.

UNITED STATES PATENT OFFICE.

CHARLES ABEL, OF NEW YORK, N. Y.

IMPROVEMENT IN HOISTING-MACHINES.

Specification forming part of Letters Patent No. 45,962, dated January 24, 1865.

*To all whom it may concern:*

Be it known that I, CHARLES ABEL, of the city of New York, in the county and State of New York, have invented a new and Improved Hoisting-Machine; and I do hereby declare that the following is a full, clear, and exact description of the construction and operation of the same, reference being had to the annexed drawings, making a part of this specification, in which—

Figure 1:
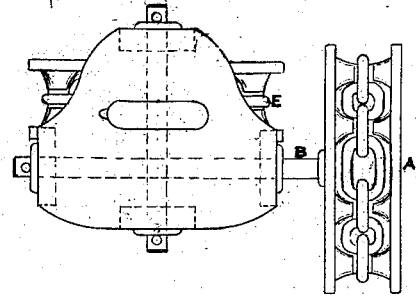
Figure 2:
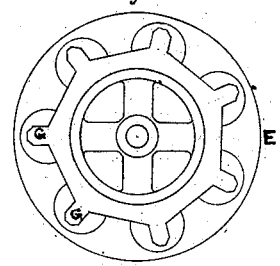
Figure 3:
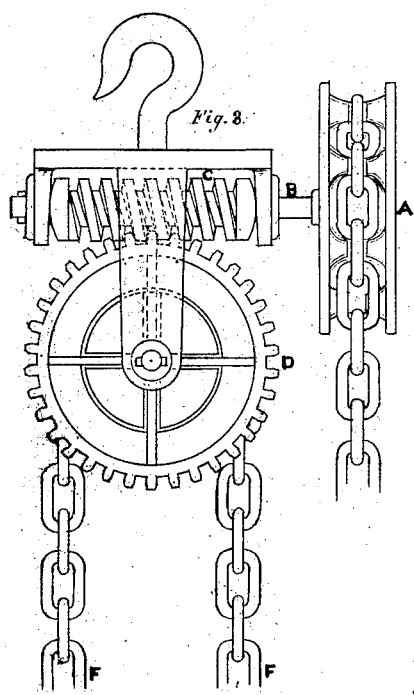
Figure 4:
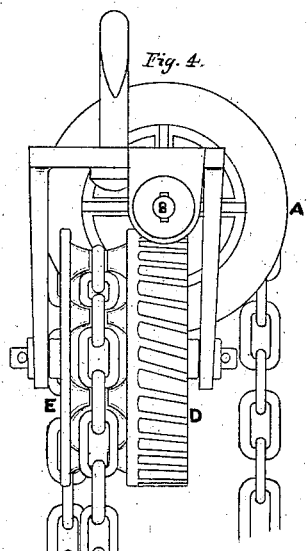
Figure 5:
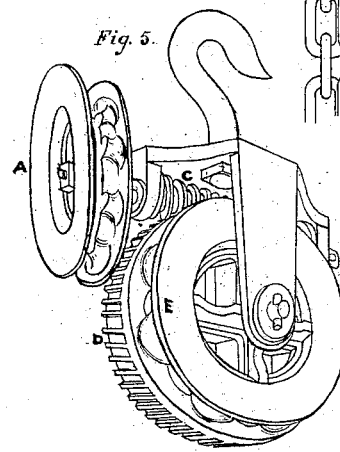

Figure 1 is a plan or top view. Fig. 2 is a section of one of the parts. Fig. 3 is a side elevation. Fig. 4 is an end elevation, and Fig. 5 is a perspective view.

The nature of my invention consists in the application of screw-gearing in the construction of a hoisting-machine in such a manner as to cause the threads of the screw to act as a stop or check to the windlass wheel or barrel, and thus, in addition to the ready transformation of velocity into power, causing the load to be securely held at every point of its elevation.

I construct a pulley-wheel, A, Fig. 3, in the usual manner, either as a chain-pulley or as a rope-pulley, and upon the shaft B, extending from said pulley, I apply the screw C, and provide a cog-wheel, D, upon the end of the windlass-barrel, or on the side of the windlass-wheel E, Fig. 4, arranged to be driven by said screw. Thus, although the said cog-wheel and windlass-wheel is readily turned by the screw, the converse is not the case, for the screw cannot be turned by the cog wheel, and the latter is thereby effectually checked by the former.

By making the windlass-wheel E, Fig. 4, a chain-wheel, I am enabled to use the hoisting-chain F F, Fig. 3, as a "double runner" by simply laying it in its place on the wheel and providing a hook upon each end of the chain. Thus when one end of the chain with its load is going up the other end of the chain is coming down ready to take on another load. The chain is held firmly on the wheel by the cogs G, Fig. 2, thus enabling the end not in use to fall freely from the wheel.

In the case of a ship's windlass I propose simply to stand the screw in a vertical position and arrange the wheel A to be turned by handspikes in the usual manner.

I am aware that a cog-wheel driven by a screw is an old device, and that the construction of the chain-wheel, Fig. 2, is not new; but—

I claim—

The construction and use of the worm-wheel D with its connected wheel E and the worm-screw C, in combination with the pulley A, substantially as and for the purpose described.

C. ABEL.

Witnesses:
   O. P. HATFIELD,
   JAMES E. WARE.